United States Patent
Yanagisawa

(12) 
(10) Patent No.: US 9,008,875 B2
(45) Date of Patent: Apr. 14, 2015

(54) HYBRID WORKING MACHINE AND SERVO CONTROL SYSTEM

(75) Inventor: Makoto Yanagisawa, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 260 days.

(21) Appl. No.: 13/145,645

(22) PCT Filed: Jan. 27, 2010

(86) PCT No.: PCT/JP2010/051028
§ 371 (c)(1),
(2), (4) Date: Jul. 21, 2011

(87) PCT Pub. No.: WO2010/087364
PCT Pub. Date: Aug. 5, 2010

(65) Prior Publication Data
US 2011/0288711 A1    Nov. 24, 2011

(30) Foreign Application Priority Data
Jan. 29, 2009   (JP) .................. 2009-018590

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *E02F 9/20* | (2006.01) |
| *B60W 10/26* | (2006.01) |
| *B66C 13/18* | (2006.01) |
| *E02F 9/22* | (2006.01) |
| *B60L 11/12* | (2006.01) |
| *B60W 20/00* | (2006.01) |

(52) U.S. Cl.
CPC .............. *E02F 9/2025* (2013.01); *B60W 10/26* (2013.01); *B60W 20/00* (2013.01); *B60W 2300/17* (2013.01); *B66C 13/18* (2013.01); *E02F 9/2075* (2013.01); *E02F 9/2217* (2013.01); *Y02T 10/7258* (2013.01); *B60L 11/12* (2013.01); *Y02T 10/7077* (2013.01); *Y02T 10/7005* (2013.01); *Y02T 10/7022* (2013.01)

(58) Field of Classification Search
USPC ...................................................... 701/22, 50
See application file for complete search history.

(56) References Cited

U.S. PATENT DOCUMENTS 5,661,380 A * 8/1997 Obara et al. .................. 318/139
5,703,472 A * 12/1997 Aoyama et al. ................. 322/28
(Continued)

FOREIGN PATENT DOCUMENTS

| JP | 10-103112 | 4/1998 |
| JP | 2001-003398 | 1/2001 |
| JP | 2002-330554 | 11/2002 |

OTHER PUBLICATIONS

International Search Report mailed on Apr. 27, 2010.

*Primary Examiner* — Nicholas Kiswanto
(74) *Attorney, Agent, or Firm* — IPUSA, PLLC

(57) ABSTRACT

A hybrid working machine has an electric power accumulator charged by a generator driven by an engine and has an electrical load driven with electric power from the electric power accumulator. The hybrid working machine includes a direct-current bus electrically connected to the electric power accumulator, a voltage detector configured to detect the voltage of the direct-current bus, and a drive control part configured to control the driving of the generator based on the detected voltage value of the voltage detector. The drive control part is configured to control the generator based on the deviation between the detected voltage value and a voltage command value.

6 Claims, 9 Drawing Sheets

(56) References Cited

U.S. PATENT DOCUMENTS

| | | |
|---|---|---|
| 6,762,523 B1 * | 7/2004 | Lisowski ................. 310/103 |
| 6,864,663 B2 | 3/2005 | Komiyama et al. |
| 7,100,721 B2 * | 9/2006 | Atarashi et al. ......... 180/65.235 |
| 7,619,378 B2 * | 11/2009 | Morinaga et al. ............ 318/139 |
| 7,701,684 B2 * | 4/2010 | Yama et al. .................... 361/78 |
| 8,000,850 B2 * | 8/2011 | Nasr et al. ...................... 701/20 |
| 2005/0001606 A1 | 1/2005 | Kagoshima |

* cited by examiner

HYBRID WORKING MACHINE AND SERVO CONTROL SYSTEM

TECHNICAL FIELD

The present invention relates to working machines, and more particularly to a hybrid workingelectric motor with electric power from an electric power machine having a hydraulic pump driven by driving an accumulator and to a servo control system.

BACKGROUND ART

Many working machines are hydraulically driven. Examples of hydraulically driven working machines include hydraulic shovels. Generally, in hydraulic shovels, a shovel is driven, an upper-part turning body is caused to turn, and a lower-part traveling body is caused to travel using hydraulic actuators (hydraulic cylinders and hydraulic motors). In general, a hydraulic pressure supplied to hydraulic actuators is often generated by a hydraulic pump whose drive source is an engine. In this case, the outputs of the hydraulic actuators are determined by the output of the engine.

A full capacity of the engine is not always required and, for example, 90% or 80% of the capacity is often sufficient for the operations of hydraulic shovels. Therefore, the operation mode of the hydraulic shovel is changed according to work loads so as to optimize engine output control for each of different work loads, thereby efficiently driving the engine to improve fuel consumption.

For example, it is made possible to set different operation modes such as "a high load mode" for performing a load operation corresponding to the maximum output of the engine, "a normal load mode" for performing a normal-load operation, and "a low load mode" for performing a light-load operation. Then, iso-horsepower control is performed so as to equalize the drive torque required by the hydraulic pump to drive the hydraulic actuators with the output torque of the engine in each operation mode, thereby efficiently utilizing the output of the engine to improve fuel consumption.

In general, hydraulic shovels are equipped with an engine whose maximum output is equal to its output in the "high load mode." However, the operation is far less often performed in the "high load mode" than in the "normal load mode." Therefore, when the hydraulic shovel is operated in the "normal load mode," the engine output is less than its maximum. In other words, the hydraulic shovel is equipped with a large engine whose output is excessive for the operation in the "normal load mode."

In recent years, there has been a demand for reduction in the amount of fuel consumed by the engine in hydraulically driven working machines including the above-described hydraulic shovel. Simple reduction in the size of the engine would result in insufficient hydraulic output at the time of operating in the "high load mode." Therefore, so-called hybrid hydraulic construction machines have been developed that are equipped with an engine, a generator driven by the engine, an electric power accumulating part charged by the generator, and an electric motor driven with the electric power of the electric power accumulating part. (See, for example, Patent Document 1.)

PRIOR ART DOCUMENT

Patent Document

[Patent Document 1] Japanese Laid-Open Patent

SUMMARY OF THE INVENTION

Problems to be Solved by the Invention

In hybrid working machines, working power (that is, power to drive the hydraulic pump) is obtained from not only the engine but also the assist motor (electric motor). The assist motor is driven with electric power from the electric power accumulating part.

In some hybrid working machines, some driven parts are driven not hydraulically but electrically. For example, some hydraulic shovels have the upper-part turning body driven to turn by a turning electric motor.

In this case, like the assist motor, the turning electric motor also is electrically connected to the electric power accumulator (battery) via a direct-current bus (DC bus).

The above-described electric power accumulator (battery) keeps the voltage of the DC bus constant. That is, if the voltage is higher at the direct-current bus (DC bus) than at the electric power accumulator (battery), electric current flows from the direct-current bus (DC bus) to the electric power accumulator (battery) to charge the electric power accumulator (battery). On the other hand, if the voltage is lower at the direct-current bus (DC bus) than at the electric power accumulator (battery), electric current flows from the electric power accumulator (battery) to the direct-current bus (DC bus) to discharge the electric power accumulator (battery).

Here, a failure of the electric power accumulator (battery) prevents the voltage of the DC bus from being controlled. In this case, not only is it impossible to charge the electric power accumulator (battery) but also it is impossible to drive electrically driven parts supplied with electric current from the DC bus to be driven (such as the above-described turning electric motor).

However, aside from the electrically driven parts, hydraulically driven parts, which may be driven with the output of the engine, are drivable without assist from the assist motor. Accordingly, it is desired to be able to drive the electrically driven parts by supplying the electrically driven parts with electric power generated by the assist motor without performing the voltage control of the direct-current bus (DC bus).

Means for Solving the Problems

In order to achieve the above-described object, according to an embodiment of the present invention, a hybrid working machine having an electric power accumulator charged by a generator driven by an engine and having an electrical load driven with electric power from the electric power accumulator is provided that includes a direct-current bus electrically connected to the electric power accumulator; a voltage detector configured to detect a voltage of the direct-current bus; and a drive control part configured to control driving of the generator based on a detected voltage value of the voltage detector, wherein the drive control part is configured to control the generator based on a deviation between the detected voltage value and a voltage command value.

Further, according to another embodiment of the present invention, a servo control system having an electric power accumulator charged by a generator driven by an engine and having an electrical load driven with electric power from the electric power accumulator is provided that includes a direct-current bus electrically connected to the electric power accumulator; a voltage detector configured to detect a voltage of the direct-current bus; and a drive control part configured to control driving of the generator based on a detected voltage value of the voltage detector, wherein the drive control part is configured to control the generator based on a deviation between the detected voltage value and a voltage command value.

Effects of the Invention

According to the present invention, by controlling the voltage of a direct-current bus by a motor generator, it is possible to supply an electrical load with electric power via the direct-current bus and drive the electrical load without keeping the voltage of the DC bus constant by an electric power accumulator.

DESCRIPTION OF EMBODIMENT

Hybrid working machines to which the present invention is to be applied may be any working machines as long as the working machines are hydraulic working machines that perform operations with a hydraulic pressure generated by a hydraulic pump by driving the hydraulic pump while assisting an engine with a motor generator driven with electric power from a battery. Examples of such hybrid working machines include power shovels, lifting magnets, cranes, and wheel loaders.

First, a description is given of a hybrid hydraulic shovel as an example hybrid working machine to which the present invention is applied.

Figure 1:
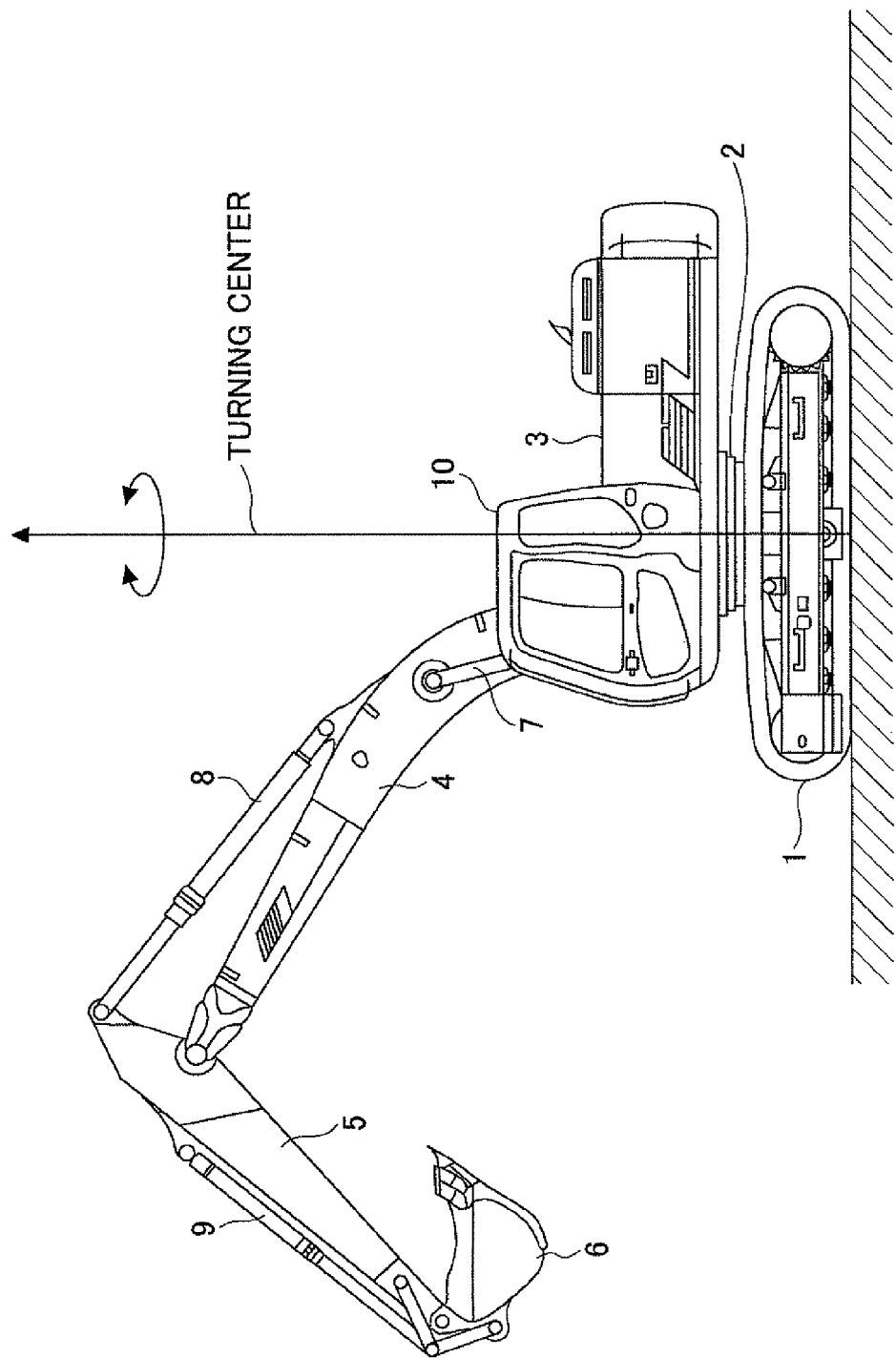
FIG. 1 is a side view of a hybrid hydraulic shovel.

FIG. 1 is a side view of a hybrid hydraulic shovel. An upper-part turning body 3 is mounted through a turning mechanism 2 on a lower-part traveling body 1 of the shovel. A boom 4 extends from the upper-part turning body 3. An arm 5 is connected to the end of the boom 4. Further, a bucket 6 is connected to the end of the arm 5. The boom 4, the arm 5, and the bucket 6 are hydraulically driven by a boom cylinder 7, an arm cylinder 8, and a bucket cylinder 9, respectively. Further, a cabin 10 and power sources (not graphically illustrated) are mounted on the upper-part turning body 3.

Figure 2:
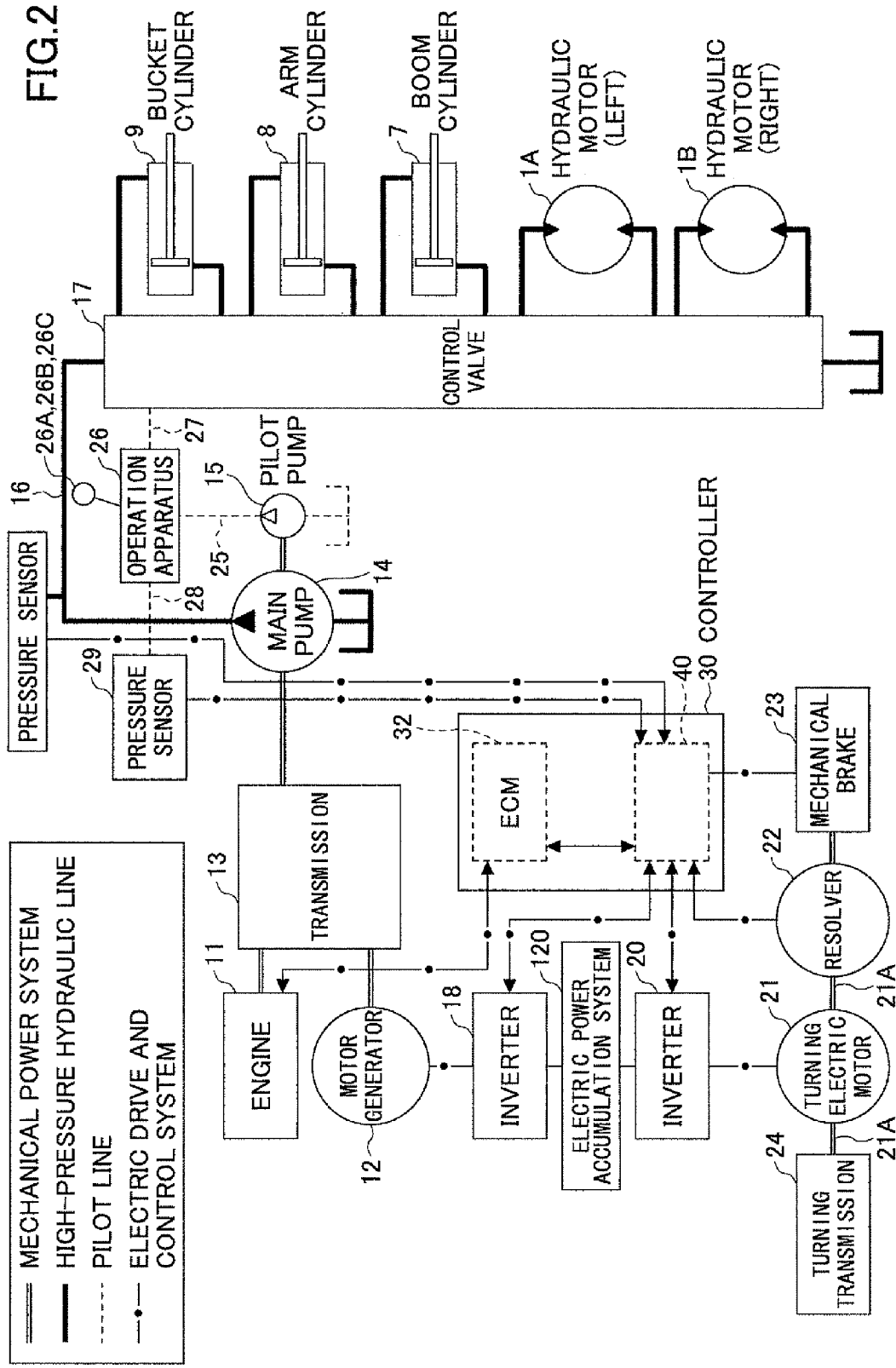
FIG. 2 is a block diagram illustrating a configuration of a drive system of the hybrid hydraulic shovel illustrated in FIG. 1.

FIG. 2 is a block diagram illustrating a configuration of the drive system of the hybrid hydraulic shovel illustrated in FIG. 1. In FIG. 2, a double line, a solid line, a broken line, and a one-dot chain line indicate a mechanical power system, a high-pressure hydraulic line, a pilot line, and an electric drive and control system, respectively.

An engine 11 as a mechanical drive part and a motor generator 12 as an assist drive part are connected to the input shafts of a transmission 13 as a power-up machine. Further, a main pump 14 and a pilot pump 15 are connected to the output shaft of the transmission 13. A control valve 17 is connected to the main pump 14 via a high-pressure hydraulic line 16. Here, the engine 11 and the motor generator 12 may be directly connected without using a transmission.

The control valve 17 is a controller that controls a hydraulic system. Hydraulic motors 1A (for the right) and 1B (for the left) for the lower-part traveling body 1, the boom cylinder 7, the arm cylinder 8, and the bucket cylinder 9 are connected to the control valve 17 via high-pressure hydraulic lines.

An electric power accumulation system 120 including an electric power accumulator is connected to the motor generator 12 via an inverter 18. A turning electric motor 21 is connected to the electric power accumulation system 120 via an inverter 20. The turning electric motor 21 is an electrical load in the hybrid hydraulic shovel. A resolver 22, a mechanical brake 23, and a turning transmission 24 are connected to a rotation shaft 21A of the turning electric motor 21. An operation apparatus 26 is connected to the pilot pump 15 via a pilot line 25. The control valve 17 and a pressure sensor 29 as a lever operation detecting part are connected to the operation apparatus 26 via hydraulic lines 27 and 28, respectively. The pressure sensor 29 is connected to a controller 30 that controls the driving of an electric system.

The hybrid hydraulic shovel having the above-described configuration is a hybrid construction machine that uses the engine 11, the motor generator 12, and the turning electric motor 21 as power sources. These power sources are mounted on the upper-part turning body 3 illustrated in FIG. 1. A description is given below of each part.

The engine 11, which is, for example, an internal combustion engine constituted of a diesel engine, has its output shaft connected to one of the input shafts of the transmission 13. The engine 11 is operated constantly during the operation of the construction machine.

The motor generator 12 may be an electric motor capable of both a power running operation and a generator operation. That is, the motor generator 12 is a generator and electric motor. Here, a motor generator driven by the inverter 18 is illustrated as the motor generator 12. This motor generator 12 may be constituted of, for example, an IPM (Interior Permanent Magnet) motor having magnets embedded in a rotor. The rotation shaft of the motor generator 12 is connected to the other one of the input shafts of the transmission 13. In this embodiment, the motor generator 12 capable of both a power running operation and a generator operation is used. Alternatively, an electric motor that performs a power running-operation and a generator that performs a generator operation may be connected to the engine 11 via a transmission.

The transmission 13 has two input shafts and one output shaft. The two input shafts are connected to the drive shaft of the engine 11 and the drive shaft of the motor generator 12, respectively. Further, the output shaft is connected to the drive shaft of the main pump 14. The power running operation and the generator operation of the motor generator 12 are switched by the controller 30 in accordance with a load on the engine 11.

The main pump 14 is a hydraulic pump that generates a hydraulic pressure to be supplied to the control valve 17. The hydraulic pressure generated in the main pump 14 is supplied via the control valve 17 to drive each of the hydraulic motors 1A and 1B, the boom cylinder 7, the arm cylinder 8, and the bucket cylinder 9, which are hydraulic loads. The pilot pump 15 is a pump that generates a pilot pressure necessary for a hydraulic operation system.

The control valve 17 is a hydraulic pressure controller that hydraulically controls the driving of the hydraulic motors 1A and 1B for the lower-part traveling body 1, the boom cylinder 7, the arm cylinder 8, and the bucket cylinder 9, which are connected via high-pressure hydraulic lines to the control valve 17, by controlling hydraulic pressures to be supplied to them in accordance with operational inputs by an operator.

The inverter 18, which is provided between the motor generator 12 and the electric power accumulation system 120 as described above, controls the operation of the motor generator 12 based on commands from the controller 30. Thus, when controlling the power running operation of the motor generator 12, the inverter 18 supplies necessary electric power to the motor generator 12 from the electric power accumulation system 120. On the other hand, when controlling the generator operation of the motor generator 12, the inverter 18 supplies the electric power accumulation system 120 with the electric power generated by the motor generator 12.

The electric power accumulation system 120 is provided between the inverter 18 and the inverter 20. Thereby, the electric power accumulation system 120 serves as a power supply for supplying necessary electric power for the power running operation during the power running operation of at least one of the motor generator 12 and the turning electric motor 21, and for storing the electric power generated by the generator operation or a regenerative operation during the generator operation or the regenerative operation of at least one of the motor generator 12 and the turning electric motor 21.

Figure 3:
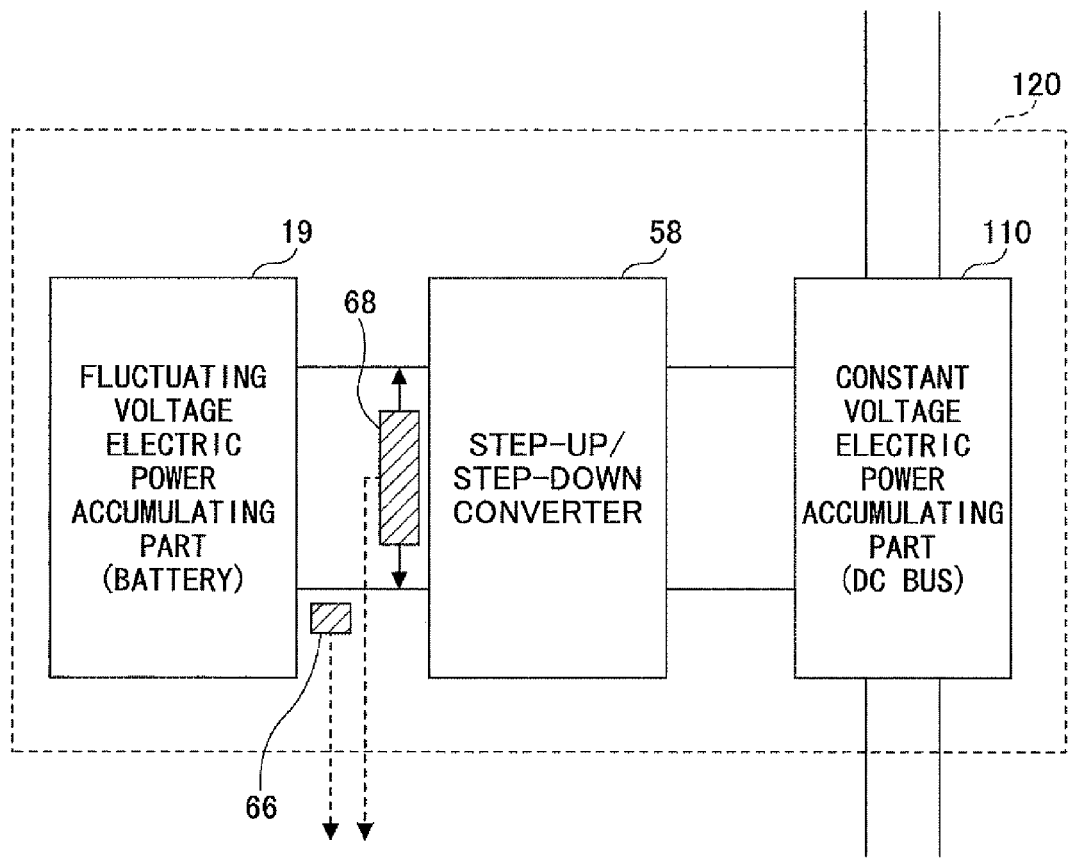
FIG. 3 is a block diagram illustrating a configuration of an electric power accumulation system.

FIG. 3 is a block diagram of the electric power accumulation system 120. The electric power accumulation system 120 includes a battery (capacitor) 19 as a fluctuating voltage electric power accumulating part. In this embodiment, a capacitor (an electric double layer capacitor) is used as the battery 19. The battery 19, however, is not limited to a capacitor and may be any battery as long as the battery may be repeatedly charged and discharged. The battery 19 is connected via a step-up/step-down converter 58 to a DC bus 110, which is a constant voltage electric power accumulating part. The inverters 18 and 20 are connected to the DC bus 110.

The inverter 20, which is provided between the turning electric motor 21 and the battery 19 as described above, controls the operation of the turning electric motor 21 based on commands from the controller 30. As a result, during the power running operation of the turning electric motor 21, necessary electric power is supplied from the electric power accumulation system 120 to the turning electric motor 21. Further, during the regenerative operation of the turning electric motor 21, the electric power generated by the turning electric motor 21 is supplied to the electric power accumulation system 120 to charge the battery 19. Here, in FIG. 2, an electric motor is used as the turning electric motor 21. The electric motor, however, may also be used for other purposes than turning. Further, multiple electric motors may be connected to the electric power accumulation system 120 and controlled.

The turning electric motor 21, which may be an electric motor capable of both a power running operation and a regenerative operation, is provided in order to drive the turning mechanism 2 of the upper-part turning body 3. At the time of the power running operation, the rotating force of the rotational driving force of the turning electric motor 21 is amplified by the transmission 24, and the upper-part turning body 3 is subjected to an acceleration or deceleration control to make a rotational movement. Further, the rpm is increased in the transmission 24 by the inertial rotation of the upper-part turning body 3 to be transmitted to the turning electric motor 21, thereby making it possible to regenerate electric power. Here, an electric motor AC-driven by the inverter 20 based on a PWM (Pulse Width Modulation) control signal is illustrated as the turning electric motor 21. This turning electric motor 21 may be constituted of, for example, an IPM motor of a magnet embedded type.

The operation apparatus 26, which is an input device for allowing an operator of the hybrid hydraulic shovel to operate the turning electric motor 21, the lower-part traveling body 1, the boom 4, the arm 5, and the bucket 6, includes levers 26A and 26B and pedals 26C. The lever 26A, which is a lever for operating the turning electric motor 21 and the arm 5, is provided near the driver's seat of the upper-part rotating body 3. The lever 26B, which is a lever for operating the boom 4 and the bucket 6, is provided near the driver's seat of the upper-part rotating body 3. Further, the pedals 26C, which are a pair of pedals for operating the lower-part traveling body 1, are provided at the foot of the driver's seat.

The operation apparatus 26 converts a hydraulic pressure (a primary-side hydraulic pressure) supplied through the pilot line 25 into a hydraulic pressure (a secondary-side hydraulic pressure) corresponding to the amount of operation by the operator, and outputs the converted hydraulic pressure. The secondary-side hydraulic pressure output from the operation apparatus 26 is supplied to the control valve 17 through the hydraulic line 27, and is also detected by the pressure sensor 29.

When the levers 26A and 26B and the pedals 26C are respectively operated, the control valve 17 is driven via the hydraulic line 27, so that the hydraulic pressures inside the hydraulic motors 1A and 1B, the boom cylinder 7, the arm cylinder 8, and the bucket cylinder 9 are controlled. As a result, the lower-part traveling body 1, the boom 4, the arm 5, and the bucket 6 are driven.

The hydraulic line 27, which is actually composed of eight hydraulic lines in total: two each for operating the hydraulic motors 1A and 1B (that is, four in total) and two each for operating the boom cylinder 7, the arm cylinder 8, and the bucket cylinder 9 (that is, six in total), is illustrated as a single hydraulic line for convenience of description.

In the pressure sensor 29 as a lever operation detecting part, a change in the hydraulic pressure inside the hydraulic line 28 due to the turning operation of the lever 26A is detected. The pressure sensor 29 outputs an electrical signal representing the hydraulic pressure inside the hydraulic line 28. This electrical signal is input to the controller 30. This makes it possible to determine the amount of turning operation of the lever 26A with accuracy. Further, while a pressure sensor is used as a lever operation detecting part in this embodiment, a sensor that reads the amount of turning operation of the lever 26A directly as an electrical signal may also be used.

The controller 30, which is a control unit that controls the driving of the hybrid hydraulic shovel, includes an engine control part 32 and a drive control unit 40. The engine control part 32 sets a target rpm at the time of engine operation and controls the amount of fuel injection for maintaining the rpm.

The drive control unit 40 controls the outputs of the turning electric motor 21, the motor generator 12, and the main pump 14 based on signals from the pressure sensor 29, the inverters 18 and 20, and the resolver 22.

Next, a description is given of drive control of the above-described hybrid hydraulic shovel.

Figure 4:
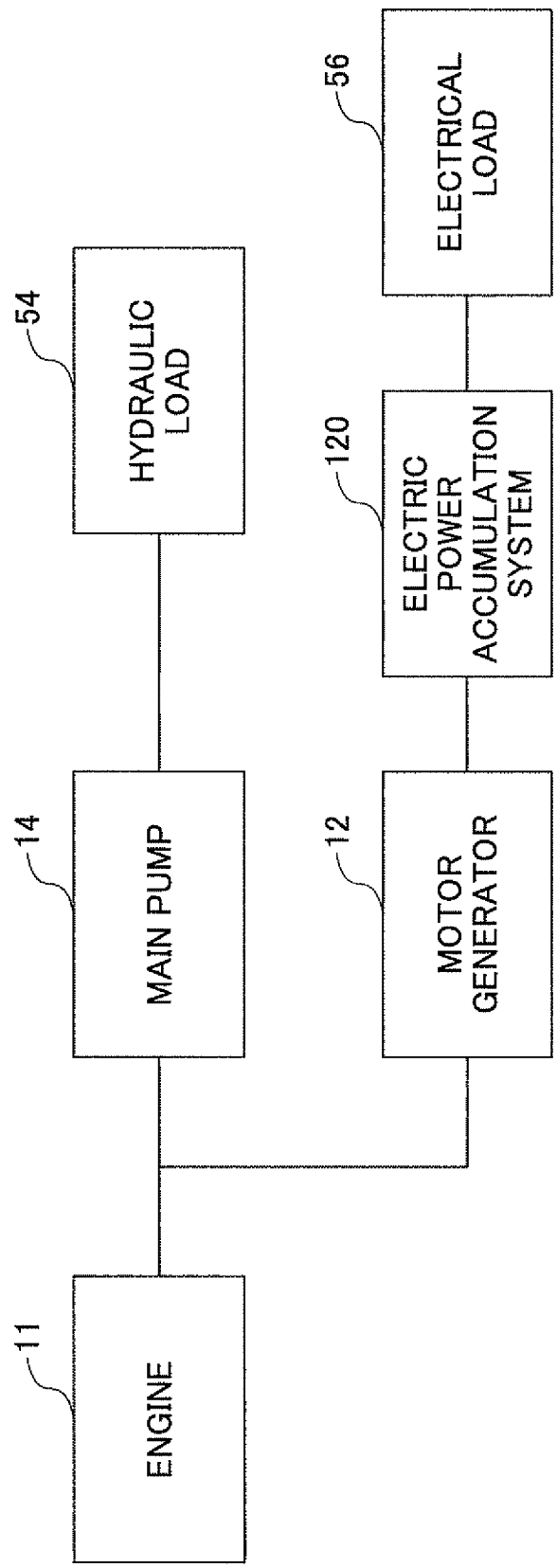
FIG. 4 is a diagram illustrating a modeled power system of the hybrid hydraulic shovel illustrated in FIG. 1.

FIG. 4 is a diagram illustrating a modeled power system of the above-described hybrid hydraulic shovel. In the model diagram of FIG. 4, a hydraulic load 54, which corresponds to components driven with a hydraulic pressure, includes the above-described boom cylinder 7, arm cylinder 8, packet cylinder 9, and hydraulic motors 1A and 1B. The hydraulic load 54 is supplied with the hydraulic pressure generated in the main pump 14, which is a hydraulic pump. The engine 11 drives the main pump 14, which is a hydraulic pump, by supplying the main pump 14 with power. That is, the power generated by the engine 11 is converted into a hydraulic pressure by the main pump 14 to be supplied to the hydraulic load 54.

An electrical load 56, which corresponds to components driven with electric power, such as an electric motor and an electric actuator, includes the above-described turning electric motor 21. The electrical load 56 is supplied with electric power from the battery 19 via the converter 58 to be driven. The case where the electrical load 56 is being driven is referred to as a power running operation. The electrical load 56 can regenerate electric power like an electric motor and generator, for example. The regenerated electric power is supplied to the DC bus 110 of the electric power accumulation system 120 to be stored in the battery 19 via the converter 58.

The battery 19 of the electric power accumulation system 120 is charged with regenerated electric power from the electrical load 56 as described above. Further, when the motor generator 12 receives power from the engine 11 to operate as a generator, it is also possible to supply and charge the battery 19 of the electric power accumulation system 120 with the electric power generated by the motor generator 12. In this embodiment, a capacitor (an electric double layer capacitor) is used as the battery 19.

In the hybrid hydraulic shovel configured as described above, the opening of a circuit between the converter 58 and the battery 19 of the electric power accumulation system 120 or the occurrence of a failure in the converter 58 prevents the voltage of the DC bus 110 from being controlled. In this case, not only is it impossible to charge the battery but also it is impossible to drive the turning electric motor 21, which is driven with electric current supplied from the DC bus 110.

However, the main pump 14 for generating a hydraulic pressure may be driven with the output of the engine 11. Therefore, the main pump 14 is drivable without assist from the motor generator 12. Further, without the converter 58 controlling the voltage of the DC bus 110, the turning electric motor 21 may be driven by controlling the voltage of the DC bus 110 by supplying the DC bus 110 with electric current through power generation by the motor generator 12. Accordingly, if it is impossible for the converter 58 to control the voltage of the DC bus 110 in the case of the opening of a circuit between the converter 58 and the battery 19 of the electric power accumulation system 120 or in the case of the occurrence of a failure in the converter 58, the voltage of the DC bus 110 is controlled by the motor generator 12 to drive the turning electric motor 12 with not electric current from the battery 19 but electric current from the motor generator 12.

Figure 5:
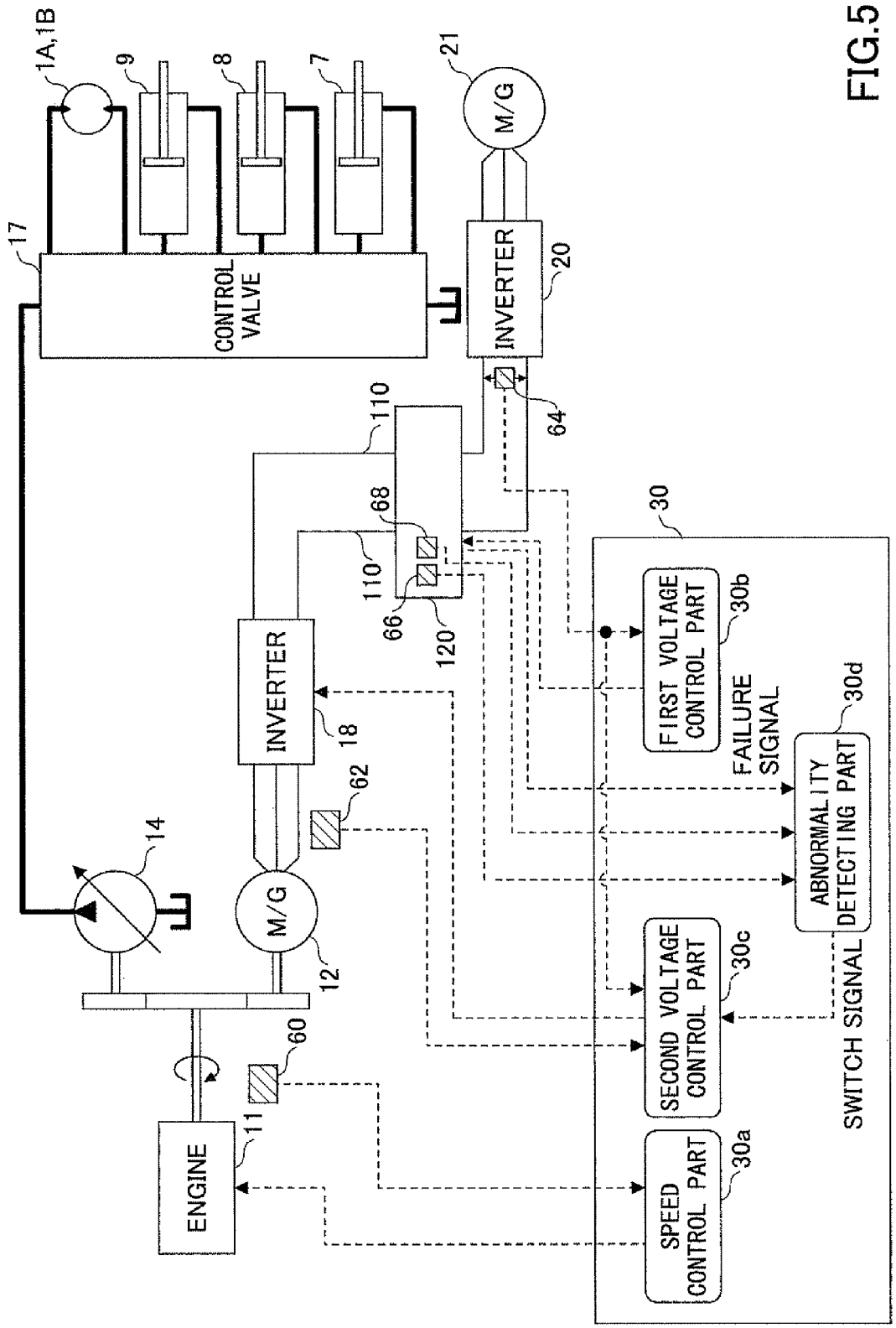
FIG. 5 is a diagram illustrating a modeled control system of the hybrid hydraulic shovel illustrated in FIG. 1.

FIG. 5 is a block diagram illustrating a control system of the above-described hybrid hydraulic shovel. In FIG. 5, the same components as those illustrated in FIG. 2 and FIG. 3 are referred to by the same characters, and a description thereof is omitted.

In this embodiment, the hybrid hydraulic shovel includes a speed sensor 60 that detects the rotational speed of the engine 11, a current sensor 62 that detects the electric current of the motor generator 12, a voltage sensor 64 that detects the voltage of the DC bus 110, a current sensor 66 that detects electric current flowing between the capacitor 19 and the converter 58, and a voltage sensor 68 that detects the voltage across the capacitor 19.

The detected speed value of the speed sensor 60 is fed to a speed control part 30a of the controller 30, which is a control part. The speed control part 30a controls the rotational speed of the engine 11 based on the fed detected speed value.

The detected voltage value of the voltage sensor 64 is fed to a first voltage control part 30b and a second voltage control part 30c of the controller 30. The detected current value of the current sensor 62 is fed to the second voltage control part 30c of the controller 30. The first voltage control part 30b controls the voltage of the DC bus 110 via the converter 58 based on the detected voltage value fed from the voltage sensor 64. The second voltage control part 30c controls the voltage of the DC bus 110 via the inverter 18 and controls the torque of the motor generator 12 based on the detected current value fed from the current sensor 62 and the detected voltage value fed from the voltage sensor 64. The voltage control by the second voltage control part 30c is performed based on the detected voltage value from the voltage sensor 64, and is performed alternatively when the voltage control by the first voltage control part 30b is not performable.

The detected current value of the current sensor 66 and the detected voltage value of the voltage sensor 68 are fed to a failure detecting part 30d of the controller 30. The failure detecting part 30d is also fed with a failure signal from the converter 58. The failure detecting part 30d generates an abnormality signal when the detected current value of the current sensor 66 and the detected voltage value of the voltage sensor 68 are abnormal or when the failure signal is fed from the converter 58. Then, the failure detecting part 30d feeds the second voltage control part 30c with the abnormality signal as a switch signal.

In response to reception of the switch signal, the second voltage control part 30c controls the voltage of the DC bus 110 by controlling the driving of the motor generator 12 by voltage control based on the detected voltage value of the voltage sensor 64. That is, when the detected current value of the current sensor 66 and the detected voltage value of the voltage sensor 68 are abnormal or when the failure signal is fed from the converter 58, not the first voltage control part 30b but the second voltage control part 30c controls the voltage of the DC bus 110 based on the detected voltage value of the voltage sensor 64.

When the detected current value of the current sensor 66 and the detected voltage value of the voltage sensor 68 are abnormal, this is believed to be due to the opening of a circuit between the capacitor 19 and the converter 58. That is, if the circuit is open between the capacitor 19 and the converter 58, for example, the detected current value of the current sensor 66 suddenly becomes zero or the detected voltage value of the voltage sensor 68 suddenly becomes zero. Therefore, such cases may be determined to be circuit opening, so that the failure detecting part 30d generates the abnormality signal. In the case where the value of the current detected by the current sensor 66 remains zero in spite of a command for the converter 58 to discharge the capacitor 19, it may also be determined that the circuit is open between the capacitor 19 and the converter 58, and the failure detecting part 30d generates the abnormality signal. Further, the failure detecting part 30d generates the abnormality signal also in such cases as the case of the failure of the converter 58, when the electrical connection between the DC bus 110 and the capacitor 19 is often lost.

As described above, when the abnormality signal is generated by the failure detecting part 30d and output to the second voltage control part 30c as the switch signal, switching to voltage control is performed.

Figure 6:
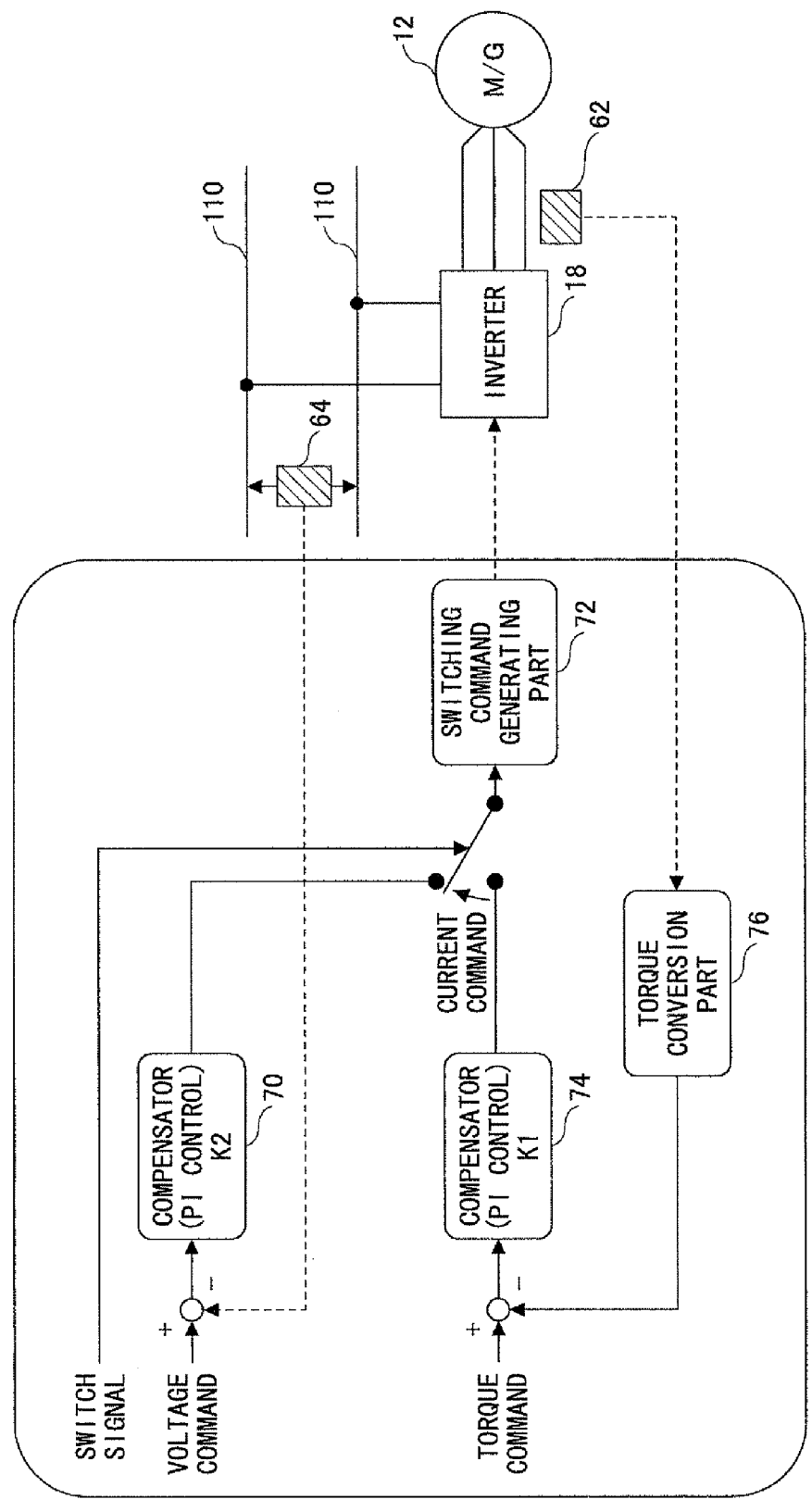
FIG. 6 is a functional block diagram of an example of the control of switching a voltage control mode.

FIG. 6 is a functional block diagram of an example of the control of switching the voltage control mode. Usually, the detected current value from the current sensor 62 is converted into a torque value in a torque conversion part 76. Then, the deviation between a torque command value for controlling the output of the motor generator 12 and the torque value from the torque conversion part 76 is fed to a compensator 74. The compensator 74 determines a current command based on the fed deviation, and feeds the current command to a switching command generating part 72. The switching command generating part 72 generates a switching command for controlling the inverter 18, which controls the driving of the motor generator 12, based on the current command, and feeds the switching command to the inverter 18. The inverter 18 controls the driving of the motor generator 12 based on the switching command.

The normal control of the motor generator 12 is as described above, and is performed when the switch signal is not fed.

On the other hand, when the abnormality signal is generated so that the switch signal is fed, the compensator 74 is switched to a compensator 70, so that voltage control is performed. In the voltage control, first, the deviation between the detected voltage value from the voltage sensor 64, which detects the voltage of the DC bus 110, and a voltage command value for causing the DC bus 110 to have a target voltage is fed to the compensator 70. The compensator 70 determines a current command by performing PI control based on the fed deviation. Then, the current command from the compensator 70 is fed to the switching command generating part 72. The switching command generating part 72 generates a switching command for controlling the inverter 18, which controls the driving of the motor generator 12, based on the current command, and feeds the switching command to the inverter 18. The inverter 18 controls the driving of the motor generator 12 based on the switching command.

The control of the motor generator 12 performed when the abnormality signal is generated is as described above.

Figure 7:
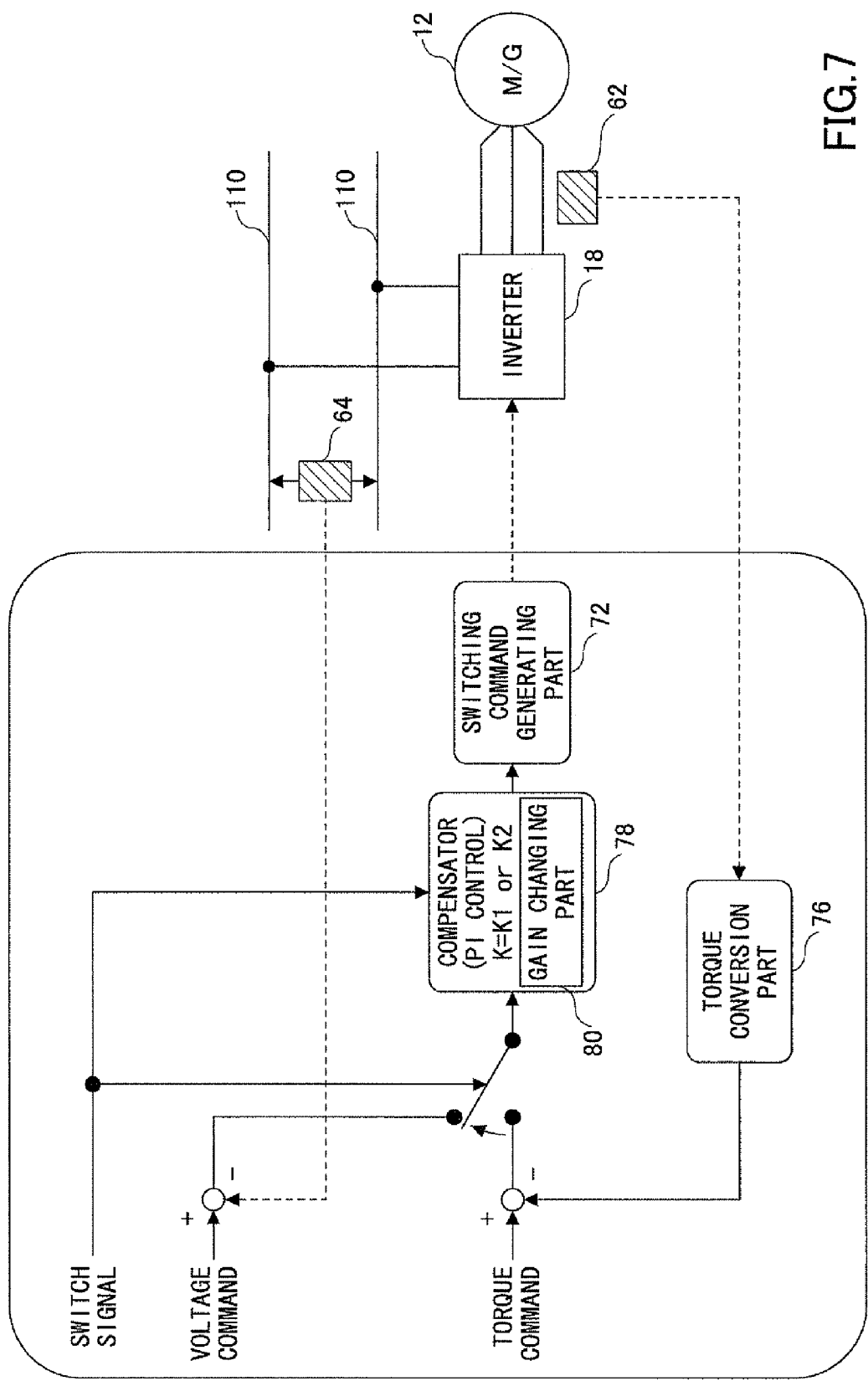
FIG. 7 is a functional block diagram of another example of the control of switching the voltage control mode.

FIG. 7 is a functional block diagram of another example of the control of switching the voltage control mode. In the case illustrated in FIG. 7, in place of switching compensators, the gains determined in a compensator 78 are switched based on the switch signal. The compensator 78 switches the gain to be used by performing PI control based on the fed deviation.

First, the value to be fed to the compensator 78 is switched, based on the switch signal, between the deviation between the detected voltage value and the voltage command value and the deviation between the torque value and the torque command value. If the switch signal is fed, switching is performed so that the deviation between the detected voltage value and the voltage command value is fed to the compensator 78.

The switch signal is fed to the compensator 78 as well. A gain changing part 80 determines that a gain K used in the compensator 78 be K1 if the switch signal is not fed. When the switch signal is not fed, such switching is performed as to feed the compensator 78 with the deviation between the torque value and the torque command value. Therefore, the compensator 78 calculates such a current command value as to cause the torque value to approach the toque command value.

On the other hand, if the switch signal is fed, the gain changing part 80 of the compensator 78 determines that the gain K to be used be K2. When the switch signal is fed, such switching is performed as to feed the compensator 78 with the deviation between the detected voltage value and the voltage command value. Therefore, the compensator 78 calculates such a current command as to cause the detected voltage value to approach the voltage command value.

The switching command generating part 72 generates a switching command for controlling the inverter 18, which controls the driving of the motor generator 12, based on the current command, and feeds the switching command to the inverter 18. The inverter 18 controls the driving of the motor generator 12 based on the switching command.

Accordingly, when the switch signal is not fed, the motor generator 12 is driven based on the switching command generated based on the gain K1 for torque control. This control is normal torque control, and is performed when the switch signal is not fed. On the other hand, when the switch signal is fed, the motor generator 12 is driven based on the switching command generated based on the gain K2 for voltage control. This control is the voltage control performed when the abnormality signal is generated, and is performed when the switch signal is supplied.

Figure 8:
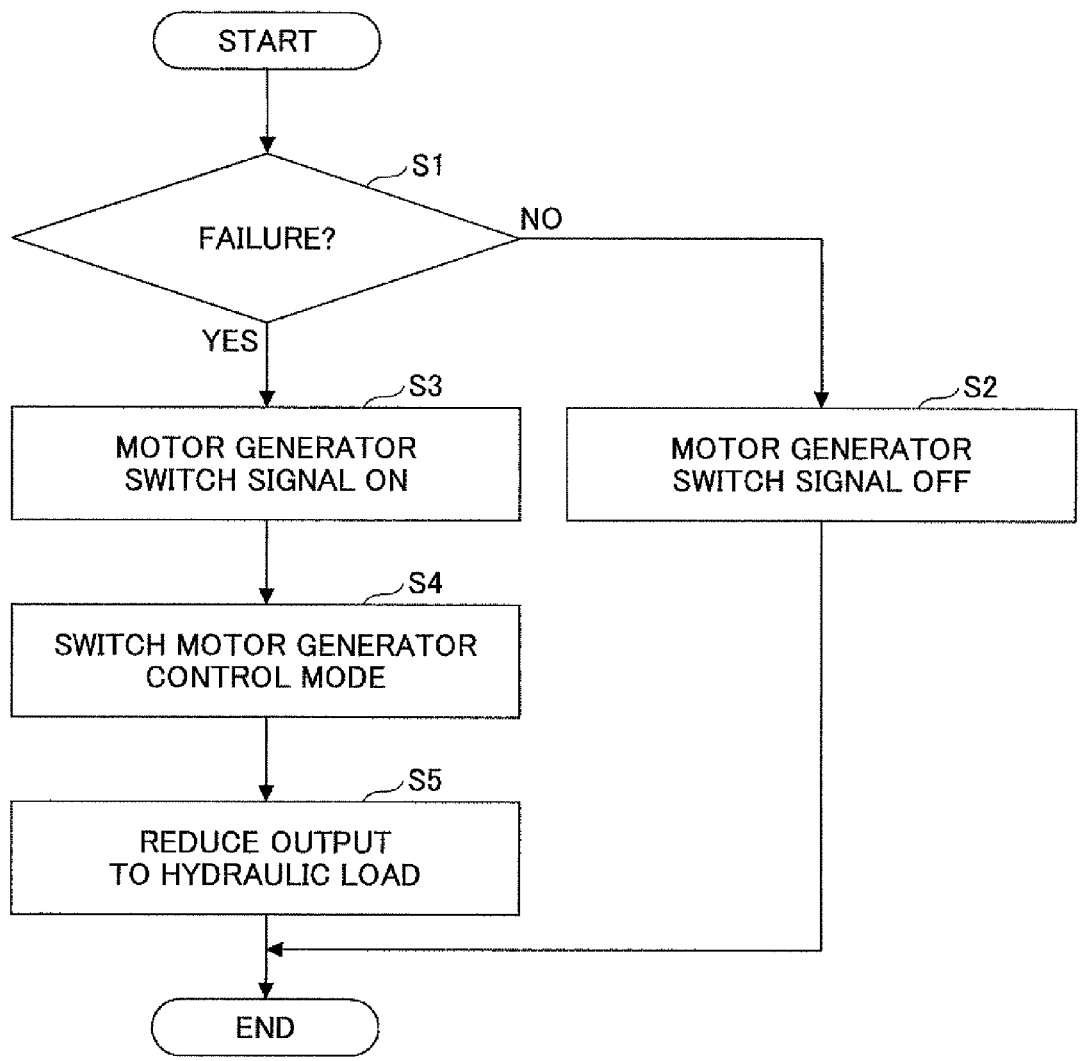
FIG. 8 is a flowchart of a process for switching the control mode of a motor generator.

Next, a description is given of a mode switching process for switching the control mode of the motor generator 12 when circuit opening or a failure occurs in the electric power accumulation system 120. FIG. 8 is a flowchart of a process for switching the control mode of the motor generator 12.

First, in step S1, the occurrence of circuit opening or a failure in the electric power accumulation system 120 is detected. This detection is performed by the abnormality detecting part 30d of the controller 30. If no occurrence of circuit opening or a failure is detected in the electric power accumulation system 120, the process proceeds to step S2. In step S2, since no failure is detected in step S1, the abnormality detecting part 30d generates no abnormality signal, causes the switch signal for switching the control mode of the motor generator 12 to be OFF, and ends the mode switching process. That is, the control mode of the motor generator 12 is the normal torque control.

On the other hand, if the occurrence of circuit opening or a failure in the electric power accumulation system 120 is detected in step S1, the process proceeds to step S3. In step S3, since a failure is detected in step S1, the abnormality detecting part 30d generates the abnormality signal. Then, the abnormality detecting part 30d causes the switch signal for switching the control mode of the motor generator 12 to be ON. In response to the switch signal being ON, in step S4, the second voltage control part 30c performs such control as to switch the voltage control mode as illustrated in FIG. 6 or FIG. 7, thereby switching the control mode of the motor generator 12 from torque control to voltage control. At this point, since the converter 58 is prevented from supplying the DC bus 110 with electric current, the first voltage control part 30b is prevented from controlling the voltage of the DC bus 110. Therefore, by switching the second voltage control part 30c to voltage control, the driving of the motor generator 12 is controlled to control the voltage of the DC bus 110. This allows the turning electric motor 21 to be driven with the electric current generated and supplied to the DC bus 110 by the motor generator 12. Since the converter 58 is prevented from performing voltage control, the driving of the motor generator 12 is controlled, so that the voltage of the DC sub 110 is controlled.

After the switching of the control mode in step S4, in step S5, the operation of controlling output to the hydraulic load is performed. Since no electric current is supplied from the capacitor 19 (battery) of the electric power accumulation system 120, the motor generator 12 is prevented from being driven with electric current from the capacitor 19, so that the main pump 14 (hydraulic pump) is to be driven by the engine 11 only. Therefore, by reducing output to the hydraulic load (that is, the output of the main pump 14), the engine 11 is prevented from being overloaded.

With the control mode of the motor generator 12 being switched to voltage control as described above, the hydraulic load may be driven to some extent by driving the main pump 14 with the engine 11 only, and the turning electric motor 21 may be driven to some extent through the power generation of the motor generator 12. That is, even if no electric current is supplied from the capacitor 19 because of the occurrence of circuit opening or a failure in the electric power accumulation system 120, the hydraulic load and the electrical load may be driven to some extent. Therefore, the occurrence of a failure does not mean an immediate stop of work, and the work may be continued with a certain output.

In this embodiment, the case is illustrated where the voltage control of the motor generator 12 is performed in response to generation of the abnormality signal. However, in the case of normal control as well, where there is no generation of the abnormality signal, such control may be performed as to keep the voltage of the DC bus 110 constant by the voltage control of the motor generator 12. In this case, the voltage of the DC bus 110 is kept constant by the inverter 18, and the converter 58 performs charge and discharge between the battery 19 and the DC bus 110 in accordance with the charge storage voltage request (the target value of the stored charge voltage) of the battery 19.

In the above-described embodiment, the description is given, taking a parallel hybrid working machine as an example, while the present invention may also be applied to so-called series hybrid working machines.

Figure 9:
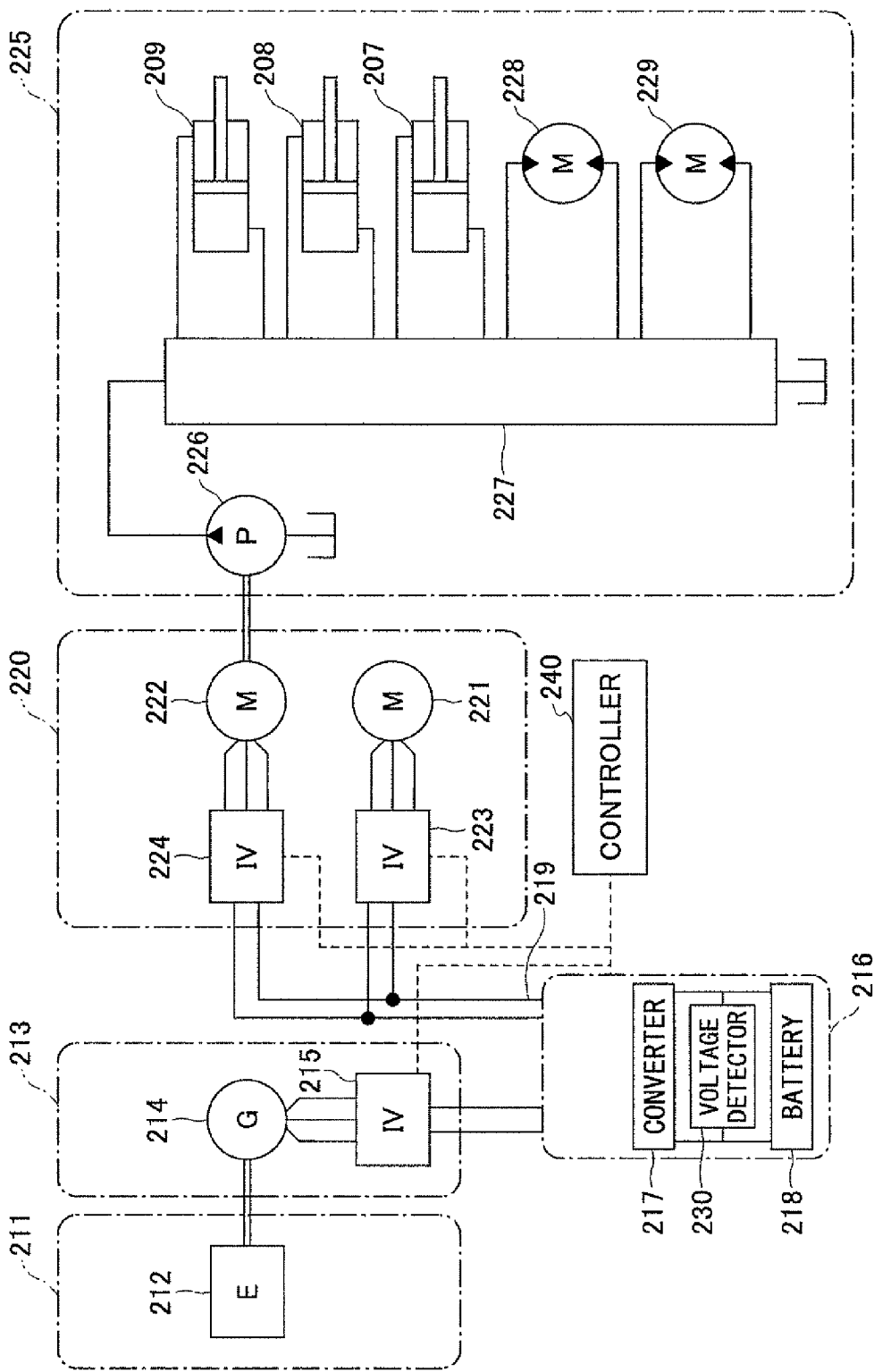
FIG. 9 is a block diagram illustrating a configuration of a series hybrid hydraulic shovel to which the present invention may be applied.

FIG. 9 is a block diagram illustrating a configuration of a series hybrid hydraulic shovel, which is a series hybrid working machine to which the present invention may be applied. In FIG. 9, a double line, a bold solid line, a fine solid line, and a dotted line indicate a mechanical power system, a hydraulic line, an electric drive system, and an electric control system, respectively.

An engine 212 of a mechanical drive part 211 drives a generator 214 of a power generating part 213. The electric power generated by the generator 214 is supplied to an electric power accumulating part 216 via an inverter 215 of the power generating part 213. The electric power supplied to the electric power accumulating part 216 is supplied to a battery 218 as an electric power accumulator by a converter 217. As a result, the battery 218 is charged.

An electrical load system 220, which is supplied with electric power from the battery 218 to be driven, includes a timing electric motor 221 and a pump driving electric motor 222. The turning electric motor 221 is a motor for driving a turning mechanism to turn an upper-part turning body. The turning electric motor 221 is supplied with electric power from the battery 218 via an inverter 223.

The pump driving electric motor 222 also is supplied with electric power from the battery 218 via an inverter 224. The pump driving electric motor 222 is a motor for driving a hydraulic pump 226 of a hydraulic load system 225.

The hydraulic pressure generated in the hydraulic pump 226 is supplied via a control valve 227 to each of a bucket cylinder 209, an arm cylinder 208, a boom cylinder 207, a traveling (right) hydraulic motor 228, and a traveling (left) hydraulic motor 229. The bucket cylinder 209 is a hydraulic cylinder for driving a bucket. The arm cylinder 208 is a hydraulic cylinder for driving an arm. The boom cylinder 207 is a hydraulic cylinder for driving a boom. The traveling (right) hydraulic motor 228 is a hydraulic motor for driving the right-side crawler of a lower-part traveling body. The traveling (left) hydraulic motor 229 is a hydraulic motor for driving the left-side crawler of the lower-part traveling body.

An electric power accumulator such as an electric double layer capacitor is used as the battery 218. The battery 218, however, is not limited to this, and other chargeable and dischargeable electric power accumulators may also be used. The electric power accumulator has the advantage of the capability of easily determining the state of charge (SOC) from the voltage across the electric power accumulator. A voltage detector 230 is connected to the terminals of the battery 218 to detect the voltage across the battery 218.

A controller 240 controls the inverters 215, 223, and 224 and the converter 217 to control electric power supplied from the generator 214 to the battery 218 (the charged capacity of the battery 218) and electric power supplied from the battery 218 to the electrical load system 220 (the discharged capacity of the battery 218). Further, the controller 240 determines the state of charge (SOC) of the battery 218 based on the detected voltage from the voltage detector 230, and controls the output (charged/discharged capacity) of the battery 218 based on the determined state of charge (SOC).

In the series hybrid hydraulic shovel of the above-described configuration, a current sensor is provided between the generator 214 and the inverter 215, and a voltage sensor that detects the voltage of a DC bus 219 is provided. Then, like in the above-described parallel hybrid hydraulic shovel, by switching the voltage control of the DC bus 219 in the controller 240, it is possible to control the generator 214 to supply electric current to the DC bus 219 and drive the electrical load. In the series hybrid hydraulic shovel, the hydraulic pump 226 is driven by the pump driving electric motor 222. Therefore, the hydraulic load also is driven with electric current due to the power generation of the generator 214.

The above description of the embodiment is given, taking hybrid working machines as examples, while the present invention may also be applied to a servo control system where an electric power accumulator is charged by a generator driven by an engine and an electrical load is driven with electric power from the electric power accumulator. That is, in a servo control system including a direct-current bus electrically connected to an electric power accumulator, a voltage detector to detect the voltage of the direct-current bus, and a drive control part to control the driving of the generator based on the detected voltage value of the voltage detector, the drive control part controls the generator based on the deviation between the detected voltage value and a voltage command value.

The present invention is not limited to the specifically disclosed embodiment, and variations and modifications may be made without departing from the scope of the present invention.

The present application is based on Japanese Priority Patent Application No. 2009-018590, filed on Jan. 29, 2009, the entire contents of which are incorporated herein by reference.

INDUSTRIAL APPLICABILITY

The present invention may be applied to hybrid working machines that have an engine to drive a hydraulic pump assisted with an electric motor.

DESCRIPTION OF THE REFERENCE NUMERALS 1 lower-part traveling body
1A, 1B traveling mechanism
2 turning mechanism
3 upper-part turning body 4 boom
5 arm
6 bucket
7 boom cylinder
8 arm cylinder
9 bucket cylinder
10 cabin
11 engine
12 motor generator
13 transmission
14 main pump
15 pilot pump
16 high-pressure hydraulic line
17 control valve
18 inverter
19 battery
20 inverter
21 turning electric motor
23 mechanical brake
24 turning transmission
25 pilot line
26 operation apparatus
26A, 26B lever
26C pedals
27 hydraulic line
28 hydraulic line
29 pressure sensor
30 controller
30a speed control part
30b first voltage control part
30c second voltage control part
30d abnormality detecting part
32 engine control part
40 drive control unit
54 hydraulic load
56 electrical load
58 converter
60 speed sensor
62, 66 current sensor
64, 68 voltage sensor
70, 74, 78 compensator
72 switching command part
76 torque conversion part
80 gain changing part
110 DC bus
120 electric power accumulation system
211 mechanical drive part
212 engine
213 power generating part
214 generator
215, 223, 224 inverter
216 electric power accumulating part
219 DC bus
220 electrical load system
221 turning electric motor
222 pump driving electric motor
225 hydraulic load system
226 hydraulic pump
227 control valve
228 traveling (right) hydraulic motor
228 traveling (left) hydraulic motor
240 controller

The invention claimed is:

1. A hybrid working machine having an electrical load driven with electric power from an electric power accumulator, comprising:
an engine;
a generator connected to the engine and driven by the engine to generate electric power to be stored in the electric power accumulator,
a hydraulic pump connected to the engine and driven to rotate by the engine;
a direct-current bus electrically connected to the electric power accumulator;
a voltage detector configured to detect a voltage of the direct-current bus;
a current detector configured to detect a current from the generator and a current flowing through the generator;
a converter provided between the electric power accumulator and the direct-current bus and configured to control a charge and a discharge of the electric power accumulator; and
a drive control part configured to control driving of the generator,
wherein the drive control part is configured to switch a mode of controlling the driving of the generator from a first mode that controls the driving of the generator by controlling a torque of the generator based on a value of the current detected by the current detector to a second mode that controls the driving of the generator based on a value of the voltage detected by the voltage detector, when an abnormality signal is generated in response to detection of an abnormality of the converter, and
wherein the drive control part is configured to reduce an output of the hydraulic pump in the second mode.

2. The hybrid working machine as claimed in claim 1, wherein the generator is a motor generator configured to operate as an assist motor with the electric power from the electric power accumulator so as to assist the engine, and
wherein a torque command value for the assist motor is determined so that the assist motor generates a desired assist power in the first mode.

3. The hybrid working machine as claimed in claim 1, wherein the drive control part is configured to output a plurality of control gains including a voltage control gain for driving the generator in the second mode and a current control gain for driving the generator in the first mode.

4. A servo control system having an electric power accumulator charged with electric power generated by a generator connected to and driven by an engine, and driving an electrical load with electric power from the electric power accumulator, comprising:
a direct-current bus electrically connected to the electric power accumulator;
a voltage detector configured to detect a voltage of the direct-current bus;
a current detector configured to detect a current from the generator and a current flowing through the generator;
a converter provided between the electric power accumulator and the direct-current bus and configured to control a charge and a discharge of the electric power accumulator; and
a drive control part configured to control driving of the generator,
wherein the drive control part is configured to switch a mode of controlling the driving of the generator from a first mode that controls the driving of the generator by controlling a torque of the generator based on a value of the current detected by the current detector to a second mode that controls the driving of the generator based on a value of the voltage detected by the voltage detector, when an abnormality signal is generated in response to detection of an abnormality of the converter, and wherein the drive control part is configured to reduce an output of a hydraulic pump connected to the engine and driven to rotate by the engine in the second mode.

5. The hybrid working machine as claimed in claim 1,
wherein the voltage of the direct-current bus is controlled through the converter in the first mode, and
wherein the voltage of the direct-current bus is prevented from being controlled through the converter in the second mode, and the voltage of the direct-current bus is controlled through an inverter connected between the generator and an electric power accumulation system including the electric power accumulator and the converter in the second mode.

6. The hybrid working machine as claimed in claim 1, wherein in the second mode, the hydraulic pump is driven by the engine alone so as to drive a hydraulic load connected to the hydraulic pump, and the electrical load is driven with the electric power generated by the generator without being supplied with the electric power from the electric power accumulator.

* * * * *